APPARATUS FOR GENERATING TIME POSITION DIAL PULSES
Filed Nov. 17, 1949
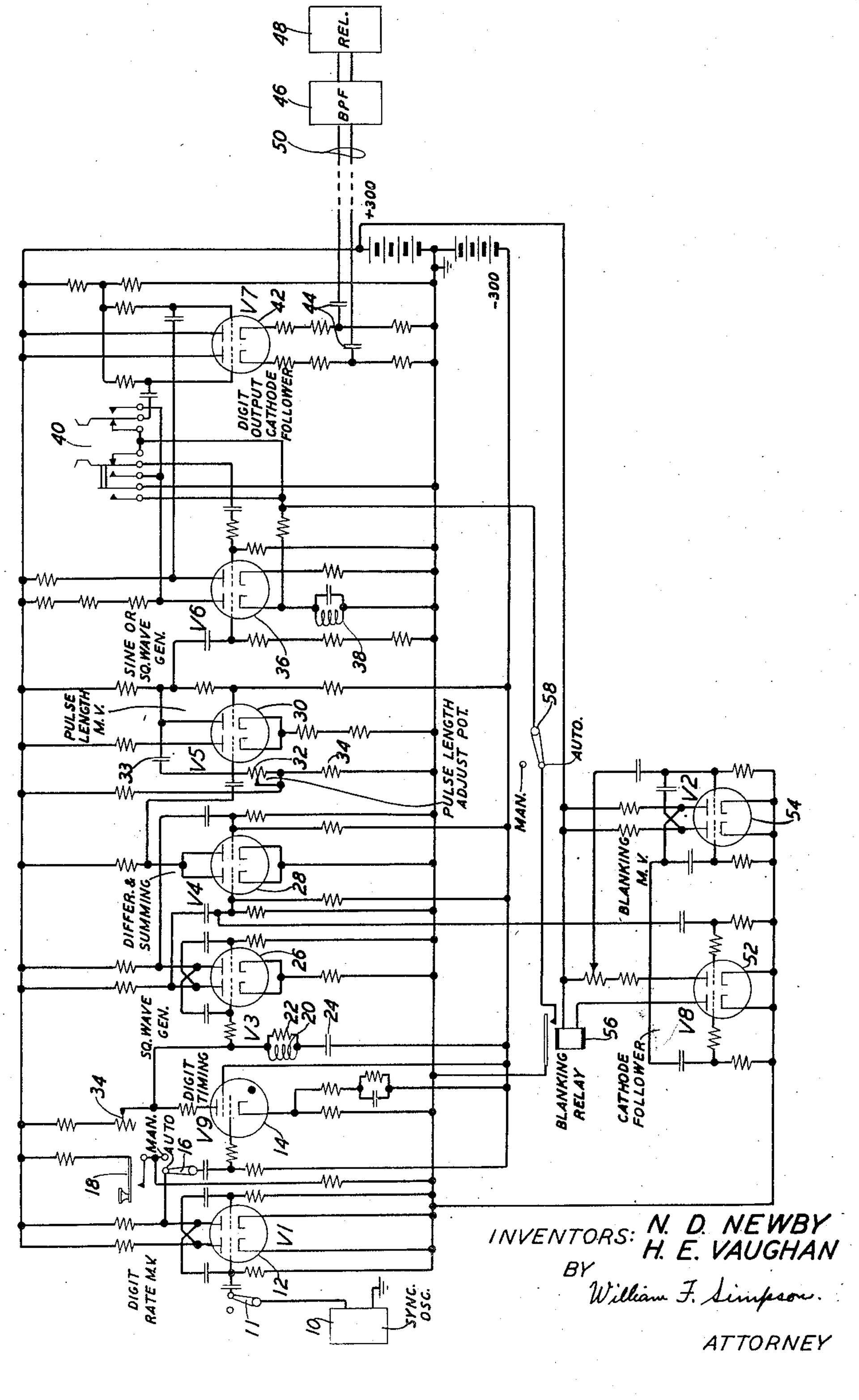
INVENTORS: N. D. NEWBY
H. E. VAUGHAN
BY William F. Simpson.
ATTORNEY Patented Aug. 11, 1953

2,648,836

UNITED STATES PATENT OFFICE 2,648,836

APPARATUS FOR GENERATING TIME POSITION DIAL PULSES

Neal D. Newby, Leonia, and Henry E. Vaughan, Chatham, N. J., assignors to Bell Telephone Laboratories, Incorporated, New York, N. Y., a corporation of New York Application November 17, 1949, Serial No. 127,912

2 Claims. (Cl. 340—349)

This invention relates to apparatus and methods for generating telephone calling signal pulses either automatically or under manual control, and more particularly, to apparatus and methods for generating pulses suitable for representing numbers or designations of subscribers' stations in automatic telephone switching systems.

The object of this invention is to provide improved pulse generating equipment and methods wherein the pulses represent a multidigit, symbol, number, or designation of telephone subscribers' stations wherein each digit or symbol of the complete designation is represented by two pulses only and the identity, character, or magnitude of each of the symbols or digits is represented by the time elapsing between the two pulses representing said digit or symbol.

A feature of this invention relates to means for controlling the shape and duration of the pulses.

Another feature of this invention relates to apparatus for continuously varying the time elapsing between the two pulses.

Another feature of this invention relates to means for continuously adjusting the over-all rate of generation of the pulses.

Another feature of this invention relates to means for suppressing all of the pulses for a predetermined interval of time.

Still another feature relates to apparatus capable of transmitting pulses representing a complete number or subscribers' station designation at a high rate of speed.

Briefly, in accordance with an exemplary embodiment of the invention, a plurality of electronic tubes are employed to generate the shaped pulses representing digits of the multidigit number at a high rate of speed. Electronic tubes and networks are provided for controlling the shape of the pulses, the value of the digits represented by the pulses and thus a time interval between the pulses as well as the time interval allotted to each digit. Means are also provided for suppressing the pulses during the rest interval between the numbers represented by the pulses. The entire period of pulses is repeated at a high rate of speed as long as may be desired.

The foregoing and other objects and features of the invention may be more readily understood from the following description of an exemplary embodiment thereof when read with reference to the attached drawing which shows details of an exemplary embodiment.

Both sections of tube 12 in the drawing are connected in a multivibrator circuit which is adjusted to run or oscillate at a frequency which is equal to or approximately equal to the desired rate of operation in the system. The multivibrator circuits, comprising both sections of tube 12, may be synchronized from a source of synchronizing oscillation for pulses of any suitable type illustrated at 10. This source of synchronizing currents may comprise an oscillator, a pulse generator, as well as other circuits capable of generating recurring wave forms and may include any desired number of pulse forming and pulse shaping, delay and other types of networks. These circuits operate in their usual manner and cooperate with the multivibrator circuit comprising tube 12 in the well-understood manner. When it is desired to synchronize the multivibrator 12 by means of local source of synchronizer signals, such as 10, switch 11 is operated to the position shown in the drawing and the time constants of the multivibrator adjusted so that its free-running period is slightly longer than the interval between the synchronizing pulses of oscillation received from the synchronizing source 10. When it is desired to operate the system without the aid of synchronizing currents, switch 11 is moved to the position opposite the one shown in the drawing and the period of the multivibrator circuit is adjusted to be substantially equal to the desired period of operation of the system, that is, the period of the multivibrator 12 is substantially equal to the time interval assigned to pulses representing each of the digits or symbols of the subscribers' number or station identification. The multivibrator circuits employed in both sections of tube 12 operate in the usual and well-understood manner in which one or the other section of this tube is conducting current in accordance with the desired operating speed of the system.

In an exemplary embodiment of this invention, the source of synchronizing current comprises a source of 90-cycle alternating current which causes the multivibrator circuit of tube 12 to operate at this frequeny and causes pulses to be transmitted at a rate of 90 digits per second.

With the switches 16 and 58 set in the automatic position, as shown in the drawing, the output or anode of the right-hand section of tube 12 is coupled to the control grid of tube 14 through a condenser and resistor coupling network.

Tube 14 comprises a plurality of elements, as shown in the drawing in which a gas at reduced pressure is provided so that tube 14 operates as a gaseous conduction tube.

As shown in the drawing, the anode of tube 14 is connected through a resistance network to the +300 volts supply and the cathode connected to a voltage dividing series of resistances and a condenser to −300 volts.

Condenser 24 is connected in the plate circuit of tube 14 in series with an inductor and resistor network comprising an inductor 20 and resistor 22. The constants of the condenser 24, as well as inductor 20 and resistor 22, are so related that upon the initiation of a discharge through tube 14, its anode falls to a low voltage near negative three hundred volts and applies a voltage to the upper terminal of condenser 24 near this value. The inductor 20 together with the resistor 22 thereupon cause the anode of tube 14 to fall to a potential, relative to the cathode of this tube, below the sustaining value of the discharge within this tube whereupon the discharge is extinguished and condenser 24 starts to charge to a positive voltage. The time required for the upper terminal of condenser 24 to reach ground potential is accurately controlled by the adjustment of variable resistor 34 and the other elements of the circuit.

Thus, each time the right-hand section of tube 12 ceases to conduct, that is, each time the left-hand section starts to conduct, the voltage of the anode of the right-hand section rises to a relatively high positive value near +300 volts since substantially no current flows through the anode resistor on the right-hand section of tube 12 at this time. As a result, a pulse of short duration of positive polarity is applied to the control grid of tube 14 at this time. The duration of this pulse is controlled by the constants of the coupling network between the control grid of tube 14 and the anode of the right-hand section of tube 12. By making these time constants of this coupling network short, a pulse of short duration is supplied to the control grid of tube 14, which pulse is sufficiently long to initiate a discharge through this tube but not sufficiently long to further interfere with or control the operation of the tube. The initiation of a discharge through tube 14 reduces the voltage of the upper terminal of condenser 24 to a large negative value whereupon the discharge through tube 14 is interrupted or ceases due to the action of condenser 24 and inductor 20, as described above. Thereafter, the upper terminal of condenser 24 starts to charge through the variable resistor 34. When the right-hand section of tube 12 again ceases to conduct, the above cycle of operations is repeated wherein the discharge is initiated through tube 14 and the upper terminal of condenser 24 charged to a large negative voltage.

The upper terminal of condenser 24 is coupled through a resistor to the control grid of the left-hand section of tube 26. Tube 26 is employed as a square wave generator and has both sections connected in multivibrator circuits similar to the circuits of tube 12. However, this multivibrator circuit is positively controlled by the potential applied to the left-hand control grid thereof. Normally with no discharge current flowing through tube 14 its anode, the upper terminal of condenser 24, and the grid of the left-hand section of tube 26 will be a more positive voltage which causes the left-hand section of tube 26 to be conducting and the right-hand section to be nonconducting. The initiation of a discharge through tube 14 applies a more negative voltage to the upper terminal of tube 14 so that the flow of current through the left-hand section of tube 26 is interrupted while the flow of current through the right-hand section of tube 26 is initiated.

So long as the potential of the upper terminal of condenser 24 is appreciably below ground potential, the left-hand section of tube 26 is not conducting, whereas the right-hand section is conducting. However, when the voltage of the left-hand section of tube 26 approaches ground potential, the left-hand section of tube 26 starts to conduct and the right-hand section ceases to conduct current. Thereafter the left-hand section conducts current and the right-hand section does not conduct current until another discharge is initiated through tube 14, at which time the current is interrupted through the left-hand section of tube 26 and a discharge initiated through the right-hand section of this tube. The constants of the condensers and resistors connected between the grids and plates of tube 26 have a longer time constant than is encountered between any two of the pulses or discharges through tube 14.

The anodes of both sections of tube 26 are coupled to differentiating networks, that is networks having a short time constant, to the corresponding control grids of tube 28. Tube 28 is normally biased so that little or no current flows in the anode-cathode path through either section of this tube. However, when the conducting conditions within tube 26 change in either manner, as described above, a positive pulse of a short duration is applied to one or the other of the control grids of tube 28 whereupon a pulse of a short duration of negative voltage appears in the combined outputs of this tube.

Thus, each time a discharge is initiated through tube 14, current through the left-hand section of tube 26 is interrupted and the positive pulse applied to the left-hand control grid of tube 28 which repeats a negative pulse in its output circuit and applies this pulse to the control grid of the left-hand section of tube 30. The pulses generated in the output circuit of tube 28 in response to initiation of a discharge through tube 14 are called start pulses. These pulses occur at regular intervals accurately controlled from the multivibrator circuit 12 and synchronizing source 10, when this source is employed to control the multivibrator circuit of tube 12.

Likewise, each time the voltage of the left-hand grid of tube 26 approaches ground potential, as described above, current starts to flow in the left-hand section of tube 26 and is interrupted in the right-hand section of this tube. Consequently, a pulse of short duration is applied to the control grid of the right-hand section of tube 28, which pulse is repeated as a negative pulse in its output circuit and again applied to the control grid of the left-hand section of tube 30. The pulses generated at this time, due to interruption of current flowing through the right-hand section of tube 26, are usually called stop or digit pulses and may occur at any time desired after the start pulse by controlling the setting of the variable resistor 34. Thus, the lower the value of this resistor, the quicker the upper terminal of condenser 24 becomes charged and thus, the quicker the pulses are applied from the right-hand section of tube 26.

As pointed out hereinbefore, the time interval between these two pulses selects or controls the character of the digit or symbol represented by the two pulses. Inasmuch as resistor 34 is continuously variable, the time between these two pulses is likewise continuously variable so that when desired the pulse generating equipment in accordance with this invention may generate pulses having continuous variable time difference between the two pulses representing the digits. Such an arrangement lends itself to testing purposes for determining measurements of operation of transmission paths and other equipment including the receiving equipment.

Tube 30 has both sections connected in a single stability circuit and is employed to control the length of the pulse. The sections of tube 30 are connected in a circuit wherein the left-hand section is normally conducting whereas the right-hand section is normally non-conducting. In other words, the grid bias applied to the left-hand section is much less than the negative bias applied to the right-hand section. It is to be noted that the left-hand section of tube 30 has its grid bias derived from a voltage-dividing network connected between +300 volts and ground whereas the right-hand section obtains its bias by means of a voltage dividing network connected to negative three hundred volts and positive three hundred volts. The networks are arranged so that the voltage of the grid of the right-hand section, however, is more negative than the grid of the left-hand section with the result that the left-hand section is normally conducting and the right-hand section non-conducting. However, upon the application of each of the negative pulses to the control grid of the left-hand connection, current flowing through this section is interrupted and the flow of current through the right-hand section initiated. The pulses applied to the left-hand section are of very short duration due to the time constant in the coupling network which has a very low value and thus in effect serves to differentiate the pulses generated in the output or anode circuit of tube 28. However, once a discharge is interrupted through the left-hand section of tube 30 and initiated through the right-hand section of tube 30, the grid of the left-hand section which is coupled through a condenser to the anode of the right-hand section becomes more negative through this coupling action which maintains the left-hand section non-conducting. This condenser, however, tends to discharge through the variable resistor 32 and resistor 34. The lower the value of resistor 32, the quicker the condenser 33 becomes discharged, whereas the higher the value of resistor 32, the longer it takes condenser 33 to become discharged. After the time controlled by resistor 32, condenser 33 becomes sufficiently discharged so that current again starts to flow through the left-hand section of tube 30 and as a result of the coupling due to the common cathode resistor of both sections of this tube, current flowing through the right-hand section is interrupted. Thus, by controlling the value or magnitude of the variable resistor 32, the time during which current flows through the right-hand section of tube 30 may be continuously varied and accurately controlled from a very short pulse to a pulse of any desirable duration. Under certain circumstances, as will be described hereinafter, this pulse length may be of the order of 0.001 of a second.

The output of the right-hand section of tube 30 is coupled to the control grid of the left-hand section of tube 36. Tube 36 is employed either as a sine wave generator or a repeater for the square pulse output from the right-hand section of tube 30. As described above, the pulses which are controlled in duration from tube 30 are pulses during which current flows in the output circuit on the right-hand section of tube 30. Consequently, the anode of this section is at a reduced voltage during the controlled time interval and thus negative pulses are generated in its output circuit, which pulses tend to interrupt the current normally flowing through the left-hand section of tube 36.

The cathode circuit of tube 36 includes a resonant network 38 comprising an inductance and a condenser. Upon the interruption of current flowing through the anode-cathode circuit of the left-hand section of tube 36 and with the key 40 non-operated or set in a position shown in the drawing, current continues to flow in the inductance 38 of the resonant network charging the condenser. When the condenser becomes sufficiently charged, the current will reverse and thus form an oscillating current in this network. This oscillating current will be in the nature of a damped oscillating transient which may be provided with any desirable decrement by properly controlling the magnitude of the resistance element in the network 38, as well as the magnitude of the other circuit elements connected thereto. The network may be tuned to a wide range of frequencies, thus permitting output pulses having any desired frequency.

At the end of the negative pulse from the right-hand section of tube 30, the left-hand section of tube 36 will again start to conduct and suppress the oscillation flowing within the resonant circuit by returning it to its initial condition. When it is desired to have an output pulse comprising a single cycle of 1000 cycles, resonant frequency will be tuned to 1000 cycles and the pulse from the output circuit of the right-hand section of tube 30 will be adjusted to approximately 0.001 of a second so that substantially a complete cycle of 1000 cycle current flows in the resonant network 38 after which time the voltage and current conditions of the network are restored to their initial condition with the result that the pulse of a single cycle of 1000 cycles current is generated across the network 38. When it is desired to have the output pulses have a different frequency, the resonant network 38 will be tuned to this different desired frequency. It is, of course, obvious that any desired number of cycles, half cycles, or portions thereof may be included in the output pulse by timing the pulse from the right-hand section of tube 30 relative to the resonant frequency of the network 38.

When key 40 is non-operated or in the sine wave position as shown in the drawing the cathode of the left-hand section of tube 36 is coupled to the control element of the right-hand section of tube 36 which tube operates as a phase inverter and inverts the phase of the voltage applied to its control grid.

The cathode of the left-hand section of tube 36 is also coupled to the grid of the left-hand section of tube 42 while the output of the plate of the right-hand section of tube 36 is coupled to the grid of the right-hand section of tube 42. Thus the two grids of tube 42 have push-pull signals applied to their grids.

Tube 42 operates as an output cathode follower stage which repeats the signals applied to its grids. The output is coupled to the cathode circuits of both sections of tube 42 with coupling condensers 44. This output may be applied to a line or transmission circuit 50 of any suitable length which may pass through any type of suitable transmission equipment to the bandpass filter 46, receiving equipment 48, either or both of which may include amplifiers, equalizers or other transmission shaping delay or other transmission networks.

As pointed out hereinbefore it is desirable to suppress all the pulses during the certain regularly recurring digit intervals. Tubes 52 and 54 are provided to suppress all pulses during desired intervals by operating a blanking relay 56.

Both sections of tube 54 are connected in a multivibrator circuit which is maintained in one position during the time it is desired to transmit the pulses and maintained in the opposite condition or position during the time it is desired to suppress all the pulses. As shown in the drawing, during the time it is desired to transmit pulses over the output circuit 50 from the pulse generating equipment, the right-hand section of tube 54 is conducting and the left-hand section non-conducting. During the time it is desired to suppress transmission pulses the right-hand section of tube 54 is non-conducting and the left-hand section of this tube conducting. During the time the right-hand section is non-conducting its anode will be at a relatively high voltage to thus apply a positive voltage to the grid of the left-hand section of tube 52 causing this section to pass sufficient current in its anode-cathode circuit to operate relay 56. Relay 56 in operating grounds the cathode of the left-hand section of tube 36 through switch 58 thus preventing the transmission of any output pulses from the system shown in the drawing. In an exemplary embodiment of this invention relay 56 is maintained operated for substantially two digit intervals and non-operated for eight such intervals.

In order to accurately time the operation of the multivibrator 54 and synchronize it with the transmission of the pulses from the system and thus with the other elements and tubes of the system, synchronizing voltage is derived from the anode of the left-hand section of tube 26 and amplified by the right-hand section of tube 54, the output of which in turn is coupled to the control grid of the right-hand section of tube 54.

As described above, each time a discharge is nitiated through tube 14 a negative pulse is applied to the control grid of the left-hand section of tube 26 thus generating a positive pulse in its output circuit. These pulses are generated at regularly recurring intervals under control of the multivibrator tube 12 and synchronizing source 10.

These pulses as pointed out above are employed to generate the start pulses. The positive pulses from the output of the left-hand section of tube 26 are also applied to the control grid of the right-hand section of tube 52 which generates a negative pulse in the output circuit of this section in response thereto. This negative pulse is applied to the control grid of the right-hand section of the multivibrator tube 54 thus interrupting the current flowing through this section and accurately synchronizing the beginning of each of the blank intervals. Of course, the other pulses which generate other start pulses are also applied to the control grid of this section but are ineffective due to the time constants of the other elements of the circuit of the multivibrator 54.

When it is desired the output may be changed from alternating-current pulses of one or more cycles duration to substantially square shaped pulses by operating key 40 to the opposite position to that shown in the drawing. Under these circumstances the resonant network 38 is short-circuited and the left-hand section of tube 36 operated either as a repeating tube or as a repeating, limiting, shaping, or pulse-correcting tube.

With switch 40 operated to the square wave position the output or anode of the left-hand section of tube 36 is coupled to the grid of the right-hand section of tube 36 which section again operates as a phase inverter. The output or anodes of both sections of tube 36 are connected to the grids of both sections of tube 42 which operates as a cathode follower as described above and repeats the signals over the output circuit. The use of a cathode follower stage for the output provides a relative low impedance output circuit having good frequency characteristics over a wide range of frequencies.

Provision has also been made to transmit the two pulses representing a desired digit at random times manually. When it is desired to so operate the arrangement in accordance with the exemplary embodiment set forth herein switches 16 and 58 are moved to their manual position. When desired these switches may be provided with a common handle, actuating, or control means.

With switch 58 in the manual position the circuit through the contacts of relay 56 is interrupted thus preventing the operation of relay 56 from interfering with or affecting the operation of the other circuits.

With switch 16 set in its manual position discharges are not initiated through tube 14 under control of source 10 or tube 12. Instead discharges are initiated through tube 14 upon the operation of key 18 only. At other times with switch 16 in its manual position no discharges are initiated through tube 14. Thus key 18 has to be operated and released for each discharge through tube 14. The operation of this key causes the coupling condenser to be charged and initiate a discharge through tube 14. So long as the key is held operated thereafter no further discharges are initiated through tube 14. Upon the release of key 18 the coupling condenser is discharged so upon the next operation of key 18 another discharge will be initiated through tube 14.

The initiation of discharges through tube 14 causes two pulses to be generated and transmitted as described above. The pulses may be either of a predetermined number of cycles or half cycles of an alternating current or they may be of a square or similar wave form.

It is to be understood that the above-described arrangemments are illustrative of the applications and the principles of this invention. Numerous other arrangements may be devised by others skilled in the art without departing from the spirit and scope of this invention.

What is claimed is:

1. In combination, a telephone calling arrangement comprising a source of regularly recurring cyclic current, apparatus connected to said source for repeatedly generating regularly recurring pulses from said source, control apparatus connected to said source for controlling the rate of recurrence of said pulses, means interconnected with said source for generating other pulses from said source which pulses are interposed between said regularly recurring pulses, apparatus connected to said means for controlling the time of generation of each of said other pulses at any one of an infinite plurality of different times between said regularly recurring pulses, pulse-forming apparatus interconnected with said means for forming a pulse having a wave form of substantially a single cycle of a sine wave under control of each of said pulses and means for suppressing the transmission of all of said pulses for predetermined regularly recurring intervals of time.

2. In combination, a telephone calling arrangement comprising a source of regularly recurring cyclic current, apparatus connected to said source for repeatedly generating regularly recurring pulses from said source, control apparatus connected to said source for controlling the rate of recurrence of said pulses, means interconnected with said source for generating other pulses from said source which pulses are interposed between said regularly recurring pulses, continuously variable control apparatus connected to said means for selectively controlling the time of generation of each of said other pulses between the times of said regularly recurring pulses, pulse forming apparatus interconnected with said means for forming pulses of a predetermined wave form under control of each of said pulses and means for suppressing the transmission of all of said pulses for predetermined regularly recurring intervals of time.

NEAL D. NEWBY.
HENRY E. VAUGHAN.

References Cited in the file of this patent

UNITED STATES PATENTS

| Number | Name | Date |
|---|---|---|
| 2,110,746 | Tolson | Mar. 8, 1939 |
| 2,409,229 | Smith | Oct. 15, 1946 |
| 2,419,292 | Shepard | Apr. 22, 1947 |
| 2,424,900 | Purington | July 29, 1947 |
| 2,433,288 | Miles | Dec. 23, 1947 |

OTHER REFERENCES

Electronics, April 1947, pages 128–130.